United States Patent
Pietrantoni et al.

(10) Patent No.: US 8,497,016 B2
(45) Date of Patent: Jul. 30, 2013

(54) CONDUCTIVE CARBON BLACK

(75) Inventors: Dante M. Pietrantoni, Rochester, NY (US); Yuhua Tong, Webster, NY (US); Michael S. Roetker, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 395 days.

(21) Appl. No.: 12/840,500

(22) Filed: Jul. 21, 2010

(65) Prior Publication Data

US 2012/0021122 A1    Jan. 26, 2012

(51) Int. Cl.
*B05D 3/02*    (2006.01)
*G03G 15/16*    (2006.01)
*G03G 15/20*    (2006.01)

(52) U.S. Cl.
USPC ......... 428/323; 399/308; 399/333; 427/385.5

(58) Field of Classification Search
None
See application file for complete search history.

(56) References Cited

U.S. PATENT DOCUMENTS

| 5,399,454 A | 3/1995 | Imai et al. | |
| 2003/0207078 A1* | 11/2003 | Finn et al. | 428/124 |
| 2005/0136245 A1* | 6/2005 | Arita et al. | 428/323 |

FOREIGN PATENT DOCUMENTS

| EP | 0867785 A2 | 3/1998 |
| EP | 2187266 A1 | 5/2010 |

* cited by examiner

*Primary Examiner* — Ramsey Zacharia
(74) *Attorney, Agent, or Firm* — Hoffman Warnick LLC

(57) ABSTRACT

Described herein is a method of forming a composition including mixing an anhydride, a silane and a solvent to form a solution. Carbon black and an isocyanate are mixed to form a carbon black mixture. The solution and the carbon black mixture are homogenized to form a carbon black dispersion.

12 Claims, 2 Drawing Sheets

CONDUCTIVE CARBON BLACK

BACKGROUND

1. Field of Use

This disclosure is directed to image forming apparatus elements in an imaging forming apparatus that require conductive particles.

2. Background

Conductive carbon black usually has a very narrow percolation threshold range. The common logarithm of an intermediate transfer member surface conductivity (Ω/□) is in the range of 8 to 13. Carbon black is a filler in films, both in transfer members and fusers, so its dispersion uniformity and interaction with polymeric resins have significant impact on the performance of these films. Solvated polymeric film coatings have been used in manufacturing seamless belts. In these coating solutions, conductive carbon black is dispersed in polymeric binder(s) with organic solvent(s). Due to the high solution viscosity required for coating these belts, the in-situ dispersion of carbon black in a polymeric solution is very difficult. Common problems in current coating processes, both for fuser members and intermediate transfer members, include non-uniform carbon black dispersion distributions and variable conductivity.

SUMMARY

Described herein is a method of forming a composition including mixing an anhydride, a silane and a solvent to form a solution. Carbon black and an isocyanate are mixed to form a carbon black mixture. The solution and the carbon black mixture are homogenized to form a carbon black dispersion.

Described herein is an intermediate transfer member that includes a layer of carbon black particles dispersed in a polymer wherein the carbon black particles exhibit FT-IR absorptions at 1660 $cm^{-1}$ and 1525 $cm^{-1}$.

Described herein is fuser member that includes a layer of carbon black particles dispersed in a polymer wherein the carbon black particles exhibit FT-IR absorptions at 1660 $cm^{-1}$ and 1525 $cm^{-1}$.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
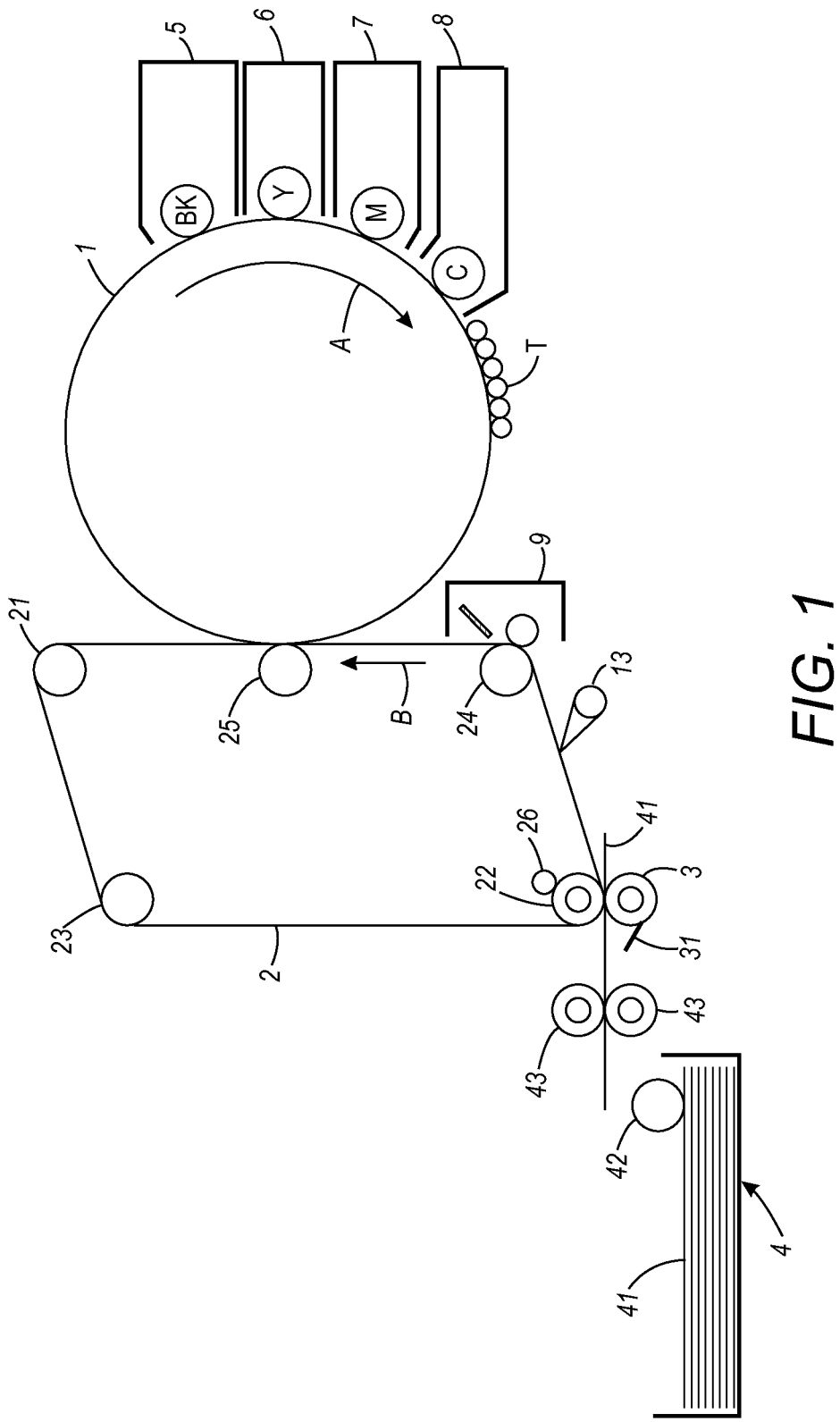
FIG. 1 is a schematic illustration of an image apparatus.

Referring to FIG. 1, an image forming apparatus includes an intermediate transfer member as described in more detail below. The image forming apparatus is an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also, in the image forming apparatus, the intermediate transfer member may be provided as a transfer-conveying member in the transfer region for transferring the toner image onto the transfer material. Having an intermediate transfer member that transfers images of high quality and remains stable for a long period is required.

The image forming apparatus described herein is not particularly limited as far as it is an image forming apparatus of intermediate transfer type, and examples include an ordinary monochromatic image forming apparatus accommodating only a monochromatic color in the developing device, a color image forming apparatus for repeating primary transfer of the toner image carried on the image carrier sequentially on the intermediate transfer member, and a tandem color image forming apparatus having plural image carriers with developing units of each color disposed in series on the intermediate transfer member. More specifically, the image forming apparatus may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and other known methods as required.

As the image carrier, a known one may be used. As the image carrier's photosensitive layer, an organic system, amorphous silicon, or other known material may be used. In the case of an image carrier of cylindrical type, the image carrier is obtained by a known method of molding aluminum or aluminum alloy by extrusion and processing the surface. A belt form image carrier may also be used.

The charging unit is not particularly limited and known chargers may be used, such as a contact type charger using conductive or semiconductive roller, brush, film and rubber blade, scorotron charger or corotron charge making use of corona discharge, and others. Above all, the contact type charging unit is preferred from the viewpoint of excellent charge compensation capability. The charging unit usually applies DC current to the electrophotographic photosensitive material, but AC current may be further superimposed.

The exposure unit is not particularly limited, for example, an optical system device, which exposes a desired image on the surface of the electrophotographic photosensitive material by using a light source such as semiconductor laser beam, LED beam, liquid crystal shutter beam or the like, or through a polygonal mirror from such light source, may be used.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used.

The second transfer unit may be the same as the first transfer unit, such as a contact type transfer charger using transfer roller and others, scorotron transfer charger, and corotron transfer charger. By pressing firmly using the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be performed.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image forming apparatus for repeating primary transfer is shown schematically in FIG. 1. The image forming apparatus shown in FIG. 1 includes a photosensitive drum 1 as image carrier, an intermediate transfer member 2, shown as an intermediate transfer belt, a bias roller 3 as transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the intermediate transfer member 2, and the primary transfer is executed by rotation of the intermediate transfer member 2 in the direction of arrow B.

Similarly, a toner image of a second color, a toner image of a third color, and a toner image of a fourth color are sequentially formed and overlaid on the transfer belt 2, and a multi-layer toner image is formed.

The multi-layer toner image transferred on the transfer belt 2 is brought to the secondary transfer unit comprising the bias roller 3 by rotation of the transfer belt 2. The secondary transfer unit comprises the bias roller 3 disposed at the surface side carrying the toner image of the transfer belt 2, backup roller 22 disposed to face the bias roller 3 from the back side of the transfer belt 2, and electrode roller 26 rotating in tight contact with the backup roller 22.

The paper 41 is taken out one by one from the paper block accommodated in the paper tray 4 by means of the pickup roller 42, and is fed into the space between the transfer belt 2 and bias roller 3 of the secondary transfer unit by means of the feed roller 43 at a specified timing. The fed paper 41 is conveyed under pressure between the bias roller 3 and backup roller 22, and the toner image carried on the transfer belt 2 is transferred thereon by rotation of the transfer member 2.

The paper 41 on which the toner image is transferred is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed.

After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31, made of polyurethane or the like, may be always in contact, and toner particles, paper dust, and other foreign matter sticking by transfer are removed.

In the case of transfer of a monochromatic image, the toner image T after primary transfer is immediately sent to the secondary transfer process, and is conveyed to the fixing or fusing device. But in the case of transfer of a multi-color image by combination of plural colors, the rotation of the intermediate transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and intermediate transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a drelt (a cross between and drum and a belt), a belt including an endless belt, an endless seamed flexible belt, an endless seamless flexible imaging belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the substrate can be by any suitable technique conventionally used in electrophotography, such as corona transfer, pressure transfer, bias transfer, and combinations of those transfer means, and the like.

The intermediate transfer member can be of any suitable configuration. Examples of suitable configurations include a sheet, a film, a web, a foil, a strip, a coil, a cylinder, a drum, an endless strip, a drelt, a circular disc, a belt including an endless belt, an endless seamed flexible belt, and an endless seamed flexible belt.

After the transfer of the developed image is completed, copy sheet 41 advances to a fusing station or fixing station (not shown in FIG. 1). Fusing components such as a fuser belt in contact with a pressure roll, a fuser roll in contact with a pressure belt, and the like, are suitable for use with the present apparatus, wherein the developed image is fused to copy sheet 41 by passing copy sheet 41 between the fusing and pressure members, thereby forming a permanent image. Alternatively, transfer and fusing can be effected by a transfix application.

Figure 2:
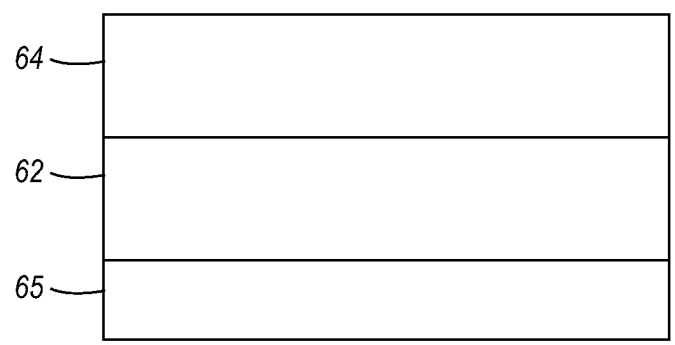
FIG. 2 is a schematic of an embodiment of a fuser member.

FIG. 2 is an enlarged schematic view of an embodiment of a fuser member, demonstrating the various possible layers. As shown in FIG. 2, a substrate 65 has an intermediate layer 62 thereon. Intermediate layer 62 can be, for example, a silicone rubber. On intermediate layer 62 is positioned a release layer 64, described in more detail below.

The intermediate layer 62 can include silicone rubbers such as room temperature vulcanization (RTV) silicone rubbers, high temperature vulcanization (HTV) silicone rubbers, low temperature vulcanization (LTV) silicone rubbers and liquid silicone rubbers (LSR). These rubbers are known and readily available commercially, such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

The release layer 64 includes a conductive carbon black dispersed in fluoroplastic particles. Such a release layer 64 provides a layer that is less brittle and less susceptible to dents or cracks while providing a low surface energy for good toner release. The thickness of the release layer of the fuser member is from about 10 to about 250 micrometers, or from about 15 to about 100 micrometers or from about 20 to about 50 micrometers.

The surface resitivity of the release layer of the fuser member is $10^8$ Ω/sq or less.

The fluoroplastic particles include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 255° C. to about 360° C. or from about 280° C. to about 330° C.

The release layer 64 can have a surface free energy of about 25 mN/m or less, wherein the surface free energy can be calculated, e.g., by using Lewis Acid-Base method from the results of the contact angle measurement using Fibro DAT1100 instrument. Fuser members are made using carbon black because of their low cost, safety and ease of scale up.

Currently, intermediate transfer belts (ITBs) and fuser members, are made primarily using carbon black (CB) as the conductive additive of choice. This is mostly the result of CB's low cost, safety and ease of scale up. The conductivity, surface uniformity, bulk homogeneity, as well as various mechanical and thermodynamic properties, such as Young's Modulus, flexural/tear strength and thermal conductivity of an ITB film can all heavily rely on the carbon black type and processing. The aforementioned properties are ultimately critical to image quality as well. These properties rely heavily on the dispersion quality of conductive carbon black in a polymeric dispersion.

Over the years, carbon blacks have proven to be one of the most versatile functional fillers for polymeric composites. In addition to providing electrical conductivity to plastic compounds, they also provide lasting protection against ultraviolet light degradation. Carbon blacks function as a moderately low cost pigment producing various shades of black in the final product. In many product formulations the polymeric composites can achieve several property combinations in one product. The selection of the proper carbon black to use in the production of conductive compounds is based not only on the final properties of the particular compound desired, but also on the specific properties of the carbon black. Examples of key carbon black properties are particle size, structure, and purity. These critical elements of the carbon black are then combined with various polymer carrier resins in the compounding process to produce the finished compound.

Carbon black when used to impart electrical conductivity to plastics exhibits a phenomenon known as percolation. Percolation is where the level of carbon black is sufficient to cause a significant and abrupt increase in electrical conductivity. As the loading of the carbon black in the compound increases, the plastic compound remains initially insulating, then as the carbon black loading continues to increases the conductivity passes through a sharp and abrupt rise over a very narrow carbon black concentration (loading) range. Further increases in carbon black loading past this threshold cause little increase in the conductivity. This narrow range is known as the percolation threshold.

Described herein is an in-situ surface treatment of the conductive carbon black surface to create a multi purpose carbon black concentrate. The concentrate has a long shelf life and can be used to manufacture intermediate transfer members and fuser members. The surface treatment of the carbon black is accomplished by a chemical grafting of anhydride and isocyanate compounds to form amido and imide bonds. This surface treated carbon black is then dispersed in organic solvents with amino silane compounds. The amino group reacts with extra anhydride from the surface treatment to form imide bonding. The concentrate is prepared by using a high speed homogenizer. In embodiments the speed of the homogenizer can be from about 600 rpm to about 20000 rpm, or from about 1000 rpm to about 15000 rpm, or from about 4000 rpm to about 10000 rpm. During the homogenization process, the silane is believed to be hydrolyzed. This hydrolization is believed to contribute to the low surface energy of films made using the carbon black concentrate.

Considering that polymeric composite conductivity is achieved by creating bridges among the conductive additives, a high quality dispersion is essential to distribute the conductive additives homogeneously within a polymer matrix and to maintain the balance of properties desired by the end-use application. The conductivity efficiency of carbon black is a function of primary particle size, structure and porosity.

Small particle size blacks have high surface area and higher inter-aggregate attractive force which result in agglomerates and a pseudo "secondary structure." Consequently, the pseudo-structure results in higher conductivity than would have been predicted based on the intrinsic structure of the nascent carbon black. However, this secondary structure can cause a reduction in mechanical property and an increase in viscosity. An ideal carbon black compound should have the following desirable attributes: low percolation threshold (efficiency), minimal degradation of mechanical properties, minimal effect on compound melt rheology, low compound moisture absorption (CMA), and cost efficiency.

For intermediate transfer belts and fuser members, the conductivity of the polymeric composite film is dependent on; the polymer matrix, the type of conductive carbon black, the concentration of the conductive carbon black, the dispersion quality of the carbon black in the polymer matrix, and the distribution of the conductive carbon black during the coating process.

To achieve better performing intermediate transfer belts and fuser members, the carbon black dispersion uniformity and stability are critical. The molecular level interaction between the carbon black and the polymeric resin will be the controlling factor.

Examples of carbon blacks selected as the conductive component for the dispersion described herein. The following carbon blacks are suitable for the embodiments described herein. Colour Black FW1 (pH 3.5, BET surface area 320 m$^2$/g), Colour Black FW18 (pH 4.5), Special Black 4 (pH 3.0), Colour Black S170 (pH 4.5), Colour Black S160 (pH 4.5), Printex L (pH 9.0) available from Evonik Degussa GmbH are suitable carbon blacks. Monarch 1000 (pH 2.5), Monarch 1400 (pH 2.5), Mogul L (pH 2.5), and Regal 400R (pH 4.0) available from Caboy Corporation are also suitable. In an embodiment, the pH of the carbon back is less than about 10. In another embodiment the pH of the carbon black is less than about 7. In another embodiment the pH of the carbon black is less than about 5.

The surface treatment of the carbon black is accomplished by mixing the carbon black with an isocyanate to form a solution. Suitable isocyanates include diisocyanohexane toluene diisocyanate and diphenylmethane diisocyanate. The isocyanate is believed to form amides on the outer surface of the carbon black particles. Additional solvents can be added to this mixture. Suitable solvents include N,N-dimethylformamide, N-methylpyrrolidone and tetrahydrofuran, toluene, hexane, cyclohexane, heptane, methyl ethyl ketone, methyl isobutyl ketone, N,N'-dimethylacetamide, methylene chloride and mixtures thereof.

The treated carbon black particles show FT-IR (fourier transform infrared) spectra absorptions at 1660 cm−1 and 1525 cm−1 confirming that amides exist on the outer surface of the carbon black particles.

A solution of an anhydride and silane is prepared. The anhydride and silane react to form an imide. Suitable silanes include 3-aminopropyltriethoxysilane, 4-aminobutyltrimethoxysilane, (aminoethylamino)-3-isobutyldimethylmethoxysilane, N-(2-aminoethyl)-3-aminopropyltroethoxysilane, 3-aminopropyltrimethoxysilane, etc., and mixtures thereof. Suitable anhydrides include trimellitic anhydride, 3,3',4,4'-biphenyl ether tetracarboxylic acid dianhydride, 1,4,5,8-naphthalene tetracarboxylic acid dianhydride and butane tetracarboxylic acid dianhydride, etc and mixtures thereof. The solution can contain solvents such as N,N-dimethylformamide, N-methylpyrrolidone and tetrahydrofuran, toluene, hexane, cyclohexane, heptane, methyl ethyl ketone, methyl isobutyl ketone, N,N'-dimethylacetamide, methylene chloride and mixtures thereof.

The solution and surface treated carbon black are homogenized to form a dispersion. In this solution, the carboxylic acid on the carbon black surface is converted to amide, and there are extra isocyanate groups on the carbon black particle surface. The anhydride/silane solution needs to be prepared separately from the carbon black dispersion because the isocyanate will preferably react with the carboxylic acid present in the anhydride/silane solution. There would be fewer amides formed on the carbon black particles if the solutions were not made separately.

Once the dispersion is manufactured it can be mixed with various polymers to form a coating solution to make a film for an intermediate transfer member or fuser member.

Polymeric material suitable for making transfer members include polyesters, polyurethanes, polyimides, fluorinated polyimides, polyolefins (such as polyethylene and polypropylene, polyethylene-co-polytetrafluoroethylene), polyamides (including polyamideimides), polyetherimides, polyphenylene sulfides, polysulfones, polycarbonates, PVDF or acrylics, or blends or alloys of such materials. These materials can also be used as the substrate layer of the fuser member shown in FIG. 2.

The resistivity of intermediate transfer belts is from about $10^8$ ohms/square, to about $10^{13}$ ohms/square, or from about $10^9$ ohms/square, to about $10^{12}$ ohms/square. The volume resistivity is from about $10^7$ ohm-cm to about $10^{12}$ ohm-cm, or from about $10^8$ ohm-cm to about $10^{11}$ ohm-cm. The resistivity can be provided by varying the concentration of the carbon black. The carbon black may be present in an amount of from about 1 weight percent to about 60 weight percent, or from about 5 weight percent to about 40 weight percent, or from about 10 weight percent to about 30 weight percent of total solids of the intermediate transfer member. The thickness of an outer layer of an intermediate transfer member is from about 1 micron to about 150 microns, or from about 10 microns to about 100 microns.

Polyimide examples are inclusive of rapidly cured polyimide polymers, such as VTEC™ PI 1388, 080-051, 851, 302, 203, 201, and PETI-5, all available from Richard Blaine International, Incorporated, Reading, Pa. Also, other thermosetting polyimides that can be cured at temperatures of above 300° C. include PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R1; and KAPTON® HN, VN and FN, all commercially available from E.I. DuPont, Wilmington, Del.

Examples of polyamideimides that can be used in the intermediate transfer member are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Also, polyimides that may be selected as the intermediate transfer member may be prepared as fully imidized polymers which do not contain any "amic" acid, and do not require high temperature cure to convert them to the imide form.

Examples of specific selected thermoplastic polyimides included in the intermediate transfer member, especially the core shell thereof, are KAPTON® KJ, commercially available from E.I. DuPont, Wilmington, Del., as represented by

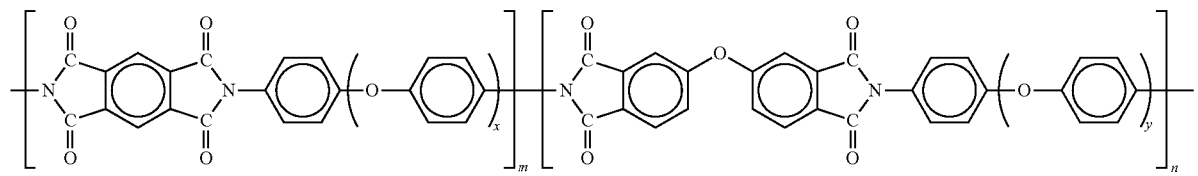

wherein x is equal to 2; y is equal to 2; m and n are from about 10 to about 300; and IMIDEX®, commercially available from West Lake Plastic Company, as represented by

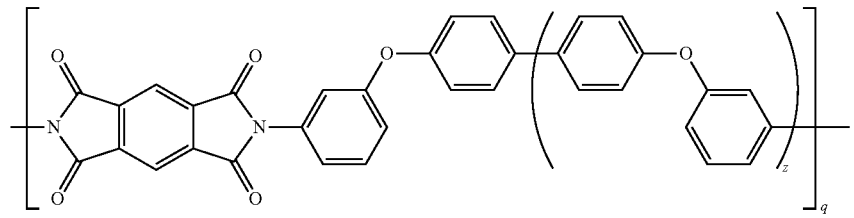

wherein z is equal to 1, and q is from about 10 to about 300. Examples of polycarbonate binders selected include poly(4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl) carbonate (also referred to as bisphenol-C-polycarbonate), and the like. In embodiments, the intermediate transfer member binders are comprised of bisphenol-A-polycarbonate resins, commercially available as MAKROLON®, with a weight average molecular weight of from about 50,000 to about 500,000.

The polymer layer is coated in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

Additives and additional fillers may be present in the above-described transfer members or fuser members. In various embodiments, other filler materials or additives including, for example, inorganic particles, can be used for the coating composition and the subsequently formed release layer. In various embodiments, exemplary inorganic particles can include metal oxides, non-metal oxides, and metals. Specifically, the metal oxides can include, for example, silicon oxide, aluminum oxide, chromium oxide, zirconium oxide, zinc oxide, tin oxide, iron oxide, magnesium oxide, manganese oxide, nickel oxide, copper oxide, antimony pentoxide, and indium tin oxide. The non-metal oxides can include, for example, boron nitride and silicon carbides (SiC). The metals can include, for example, nickel, copper, silver, gold, zinc, and iron. In various embodiments, other additives known to one of ordinary skill in the art can also be included to form the disclosed composite materials.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Carbon Black Surface Modification and Dispersion

Solution A: 19.8 grams of trimellitic anhydride was dissolved in 400 grams of solvent N,N-dimethylformamide (DMF) with stirring. To this clear solution, 18.4 grams of 3-aminopropyltrimethoxysilane was added dropwise over 2 hours at room temperature. After addition, the solution was heated to 160° C. for 14 hours. When the reaction mixture was cooled to room temperature, a viscous opaque solution was obtained.

Dispersion B: 18.6 grams of diisocyanohexane was mixed with 620 grams of solvent (DMF), and 100 grams carbon black FW 1 from EVONIK® was added with vigorous agitation. This dispersion was mixed at room temperature for 18 hours. FT-IR showed absorptions at 1660 $cm^{-1}$ and 1525 $cm^{-1}$, indicating the amide bonding in the mixture.

Solution A was added to solution B slowly at room temperature. The mixture was homogenized at 6400 rpm for 1 hour. The resulting dispersion had volume average particle size of 680 nm. After allowing the dispersion to sit on the bench for two weeks, there was no phase separation, demonstrating dispersion stability.

Example 2

ITB Film Coating 2.0 grams of Polysulfone resin (Radel) was dissolved in 4 grams of DMF and 4 grams of THF. 1.5 grams of the carbon black dispersion prepared in Example 1 was added to the polysulfone resin solution. The resulting mixture was agitated by shaking for 2 hours. The mixture was coated as an overcoat on a polyimide ITB substrate. The overcoat thickness was about 16 microns. The surface resistivity of this is shown in Table 1.

TABLE 1

| | Applied voltage, volt | | | | |
|---|---|---|---|---|---|
| | 10 | 100 | 250 | 500 | 1000 |
| Surface Resistivity, Ω/□ | 2.23E+11 | 5.81E+10 | 4.57E+10 | 3.66E+10 | 2.88E+10 |

Table 1 shows that surface resistivity of the ITB had low variability against applied voltage. This confirms that the carbon black dispersion is very uniform and stable.

In comparison experiments, the carbon black FW1, available from EVONIK®, without any surface modification, was used. In these experiments, the surface resistivity varied wildly.

An in-situ surface modification on conductive carbon black as described herein demonstrates a large improvement in the carbon black dispersion, as evidenced by the resulting conductive stability and much improved coating uniformity of the ITB film.

Other embodiments of the present teachings will be apparent to those skilled in the art from consideration of the specification and practice of the present teachings disclosed herein. It is intended that the specification and examples be considered as exemplary only, with the true scope and spirit of the present teachings being indicated by the following claims.

What is claimed is:

1. An intermediate transfer member comprising:
a layer configured for use in an intermediate transfer member comprising carbon black particles dispersed in a polymer, wherein the carbon black particles have been mixed with an isocyanate to form a mixture, and the mixture is subsequently homogenized with a solution of a silane and a solvent to form a carbon black dispersion, wherein the carbon black dispersion is dispersed in the polymer and wherein the carbon black particles exhibit FT-IR absorptions at 1660 $cm^{-1}$ and 1525 $cm^{-1}$.

2. The intermediate transfer member of claim 1 wherein the polymer is selected from the group consisting of polyesters, polyurethanes, polyimides, fluorinated polyimides, polyamideimides, polyolefins, polyamides, polyetherimides, polyphenylene sulfides, polysulfones, polycarbonates, PVDF and acrylics.

3. A method of manufacturing the intermediate transfer member of claim 1 comprising;
mixing the carbon black dispersion with a polymer to form a coating mixture;
coating the coating mixture on a substrate; and
drying the coating mixture.

4. The method of claim 3 wherein the polymer is selected from the group consisting of polyesters, polyurethanes, polyimides, fluorinated polyimides, polyamideimides, polyolefins, polyamides, polyetherimides, polyphenylene sulfides, polysulfones, polycarbonates, PVDF and acrylics.

5. A fuser member comprising:
a layer configured for use in a fuser member comprising carbon black particles dispersed in a polymer, wherein the carbon black particles have been mixed with an isocyanate to form a mixture, and the mixture is subsequently homogenized with a solution of a silane and a solvent to form a carbon black dispersion, wherein the carbon black dispersion is dispersed in the polymer and wherein the carbon black particles exhibit FT-IR absorptions at 1660 $cm^{-1}$ and 1525 $cm^{-1}$.

6. The fuser member of claim 5 wherein the layer comprises a substrate layer.

7. The fuser member of claim 6 polymer is selected from the group consisting of polyesters, polyurethanes, polyimides, fluorinated polyimides, polyamideimides, polyolefins, polyamides, polyetherimides, polyphenylene sulfides, polysulfones, polycarbonates, PVDF and acrylics.

8. The fuser member of claim 5 wherein the layer comprises a release layer.

9. The fuser member of claim 8 polymer is selected from the group consisting of polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

10. A method of manufacturing the fuser member of claim 5 comprising;
mixing the carbon black dispersion with a polymer to form a coating mixture;
coating the coating mixture on a substrate; and
drying the coating mixture.

11. The method of claim 10 wherein the polymer is selected from the group consisting of polyesters, polyurethanes, polyimides, fluorinated polyimides, polyamideimides, polyolefins, polyamides, polyetherimides, polyphenylene sulfides, polysulfones, polycarbonates, PVDF and acrylics.

12. The method of claim 10 wherein the polymer is selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

* * * * *